US009959883B2

(12) United States Patent
Choueiri et al.

(10) Patent No.: US 9,959,883 B2

(45) Date of Patent: May 1, 2018

(54) METHOD AND SYSTEM FOR PRODUCING LOW-NOISE ACOUSTICAL IMPULSE RESPONSES AT HIGH SAMPLING RATE

(71) Applicant: The Trustees of Princeton University, Princeton, NJ (US)

(72) Inventors: Edgar Y. Choueiri, Princeton, NJ (US); Joseph Tylka, New Brunswick, NJ (US); Rahulram Sridhar, Princeton, NJ (US); Braxton Boren, Astoria, NY (US)

(73) Assignee: The Trustees of Princeton University, Princeton, NJ (US)

( * ) Notice: Subject to any disclaimer, the term of this patent is extended or adjusted under 35 U.S.C. 154(b) by 0 days. days.

(21) Appl. No.: 15/287,355

(22) Filed: Oct. 6, 2016

(65) Prior Publication Data

US 2017/0098454 A1 Apr. 6, 2017

Related U.S. Application Data

(60) Provisional application No. 62/237,739, filed on Oct. 6, 2015.

(51) Int. Cl.
*H04B 15/00* (2006.01)
*G10L 21/0232* (2013.01)
(Continued)

(52) U.S. Cl.
CPC ............ *G10L 21/0232* (2013.01); *H04R 3/00* (2013.01); *H04R 3/04* (2013.01); *H04R 29/004* (2013.01); *H04S 1/005* (2013.01)

(58) Field of Classification Search
CPC .......... H04R 3/00; H04R 3/04; H04R 20/004; H04S 1/005; G10L 21/0232
(Continued)

(56) References Cited

U.S. PATENT DOCUMENTS 4,535,417 A * 8/1985 Peacock ................. G01V 1/364 367/45
5,168,213 A * 12/1992 Wardle ................... G01R 23/14 324/76.27

(Continued)

OTHER PUBLICATIONS

Craven, "Antialias Filters and System Transient Response at High Sample Rates," J. Audio Eng. Soc. 52(3), pp. 216-242 (Mar. 2004).

(Continued)

*Primary Examiner* — William A Jerez Lora
(74) *Attorney, Agent, or Firm* — Wilmer Cutler Pickering Hale and Dorr LLP

(57) ABSTRACT

The method and system for measuring low-noise acoustical impulse responses at high sampling rates of the present invention utilizes two exponential sine sweeps (ESSs) to measure the impulse responses. The first ESS is a quick sweep up to the Nyquist frequency to provide an estimate of the system response and sample the ambient noise. This measurement is used to algorithmically determine an appropriate pass-band of the system. A second, slower sweep through the pass-band alone is then executed and a corresponding band-pass filter is applied to the resulting output signal to suppress noise. The result is a measured impulse response with an improved signal-to-noise ratio and a much-reduced pre-response.

6 Claims, 4 Drawing Sheets

(51) Int. Cl.

| | |
|---|---|
| ***H04R 3/04*** | (2006.01) |
| ***H04R 29/00*** | (2006.01) |
| ***H04R 3/00*** | (2006.01) |
| *H04S 1/00* | (2006.01) |

(58) Field of Classification Search

USPC .......................................................... 381/94.3

See application file for complete search history.

(56) References Cited

U.S. PATENT DOCUMENTS

| | | | | | |
|---|---|---|---|---|---|
| 5,300,878 | A * | 4/1994 | Wardle | G01R 23/14 | 324/76.27 |
| 5,388,080 | A * | 2/1995 | Feintuch | G10K 11/178 | 367/135 |
| 5,553,014 | A * | 9/1996 | De Leon, II | H03H 21/0012 | 708/322 |
| 6,166,533 | A * | 12/2000 | Musha | G01R 23/173 | 324/76.22 |
| 6,275,020 | B1 * | 8/2001 | Nagano | G01R 23/173 | 324/76.19 |
| 6,989,663 | B2 * | 1/2006 | Nagle | G01R 35/005 | 324/115 |
| 2017/0110141 | A1 * | 4/2017 | Craven | G10L 19/26 | |

OTHER PUBLICATIONS

Farina, "Advancements in impulse response measurements by sine sweeps," Convention Paper 7121, presented at the AES 122nd Convention, May 5-8, 2007 (21 pages).

Farina, "Simultaneous Measurement of Impulse Response and Distortion with a Swept-Sine Technique," paper No. 5093 (D-4), presented at the AES 108th Convention, Feb. 19-22, 2000 (24 pages).

Mills, "On the Minimum Audible Angle," J. Acoust. Soc. Am. 30(4), pp. 237-246 (Apr. 1958).

Müller and Massarani, "Transfer-Function Measurements with Sweeps," J. Audio Eng. Soc. 49(6), pp. 443-471 (Jun. 2001).

Tylka et al., "A New Approach to Impulse Response Measurements at High Sampling Rates," Convention Paper 9183, presented at the AES 137th Convention, Oct. 9-12, 2014 (14 pages).

Vetter and di Rosario, "ExpoChirpToolbox: a Pure Data implementation of ESS impulse response measurement," presented at the 4th Pure Data Convention, 8 pages (2011).

* cited by examiner

| | SNR (dB) | PDA (%) |
|---|---|---|
| Initial Sweep | 21 | - |
| Optimal-SNR | 37 | <0.2 |
| Constrained-PDA | 24 | <0.4 |

Fig. 4

METHOD AND SYSTEM FOR PRODUCING LOW-NOISE ACOUSTICAL IMPULSE RESPONSES AT HIGH SAMPLING RATE

This application relates to and claims priority under 35 U.S.C. § 119(e) to U.S. Provisional Patent Application No. 62/237,739, titled "METHOD AND SYSTEM FOR PRODUCING LOW-NOISE ACOUSTICAL IMPULSE RESPONSES AT HIGH SAMPLING RATE," which was filed on Oct. 6, 2015 and is hereby incorporated by reference and is hereby incorporated by reference herein in its entirety.

BACKGROUND

This application is directed to a method and system for producing low-noise acoustical impulse responses and more particularly to a method and system for producing low-noise acoustical impulse responses at high sampling rates for use in acoustical systems.

A well-established approach for measuring impulse responses (IRs) of acoustical systems at sampling rates of either 44.1 kHz or 48 kHz involves the use of an exponential sine sweep (ESS) up to the Nyquist frequency. However, some acoustical systems have responses that extend beyond 24 kHz, and using this conventional ESS approach presents problems.

If the conventional ESS approach is used to measure a system whose response extends beyond the Nyquist frequency, the anti-aliasing filter of the A/D converter will low-pass filter the system response with a cut-off near the Nyquist frequency, eliminating the response that exists above this point. This would manifest itself as a spurious (non-causal) pre-response in the measured IR. Therefore, in order to accurately characterize the entire system response, it is necessary to adopt higher sampling rates. Doing so would eliminate the pre-response, but poses the risk of damaging the transducers when attempting a sweep to a higher Nyquist frequency. This is especially true when using long-duration sweeps as is done in existing methods. Additionally, as the system response may now fall below the noise floor prior to the Nyquist frequency, high-frequency noise can potentially contaminate the measurement and yield a less than maximal signal-to-noise ratio.

Abrupt termination of the sweep before the Nyquist frequency introduces artifacts such as an end-of-sweep "pop" in the transducer that corrupts the measurement and may damage the transducers. This issue can be prevented by applying a fade-out to the end of the sweep as is done in existing methods. However, this solution is only viable when employing the time-reversed sweep inversion approach derived by Angelo Farina and described in the article entitled "Simultaneous Measurement of Impulse Response and Distortion with a Swept-Sine Technique," presented at the AES 108$^{th}$ Convention, February 2000, since the exact, frequency-domain inverse of the faded-out sweep will cause excessive high-frequency noise amplification. However, the time-reversed sweep inversion approach produces a pre-response if the sweep does not cover the entire system response.

A critical step in such impulse response interpolations is locating impulse response onsets for time-alignment, a task which becomes difficult in the presence of pre-responses. Furthermore, it has been found that pre-responses can be audible as described by Peter G. Craven in "Antialias Filters and System Transient Response at High Sample Rates," J. Audio Eng. Soc., 52(3):216-242 (2004), and so their suppression is desirable.

It is therefore an object of the present invention to provide a method and system of measuring low-noise acoustical impulse responses at high sampling rates that enable low noise measurement without non-causal pre-response contamination.

SUMMARY

The method and system for measuring low-noise acoustical impulse responses at high sampling rates of the present invention utilizes two exponential sine sweeps (ESSs) to measure the impulse responses. The first ESS is a quick sweep up to the Nyquist frequency to provide an estimate of the system response and sample the ambient noise. This measurement is used to algorithmically determine an appropriate pass-band of the system. A second, slower sweep through the pass-band alone is then executed and a corresponding band-pass filter is applied to the resulting output signal to suppress noise. The result is a measured impulse response with an improved signal-to-noise ratio and a much-reduced pre-response.

BRIEF DESCRIPTION OF THE DRAWINGS

FIG. 4 is a table of signal-to-noise ratio and peak deviation amplitude values from various measurements in the method.

DETAILED DESCRIPTION

In general, the method and system for measuring low-noise acoustical impulse responses at high sampling rates of the present invention carries out a quick (approximately 1 second or shorter) initial ESS up to the Nyquist frequency to provide an estimate of the system response and sample the ambient noise. This measurement is used to algorithmically determine an appropriate pass-band of the system. A second, slower sweep through the pass-band alone is then executed and a corresponding band-pass filter is applied to the resulting output signal to suppress noise. The result is a measured impulse response with an improved signal-to-noise ratio and a much-reduced pre-response.

Figure 1:
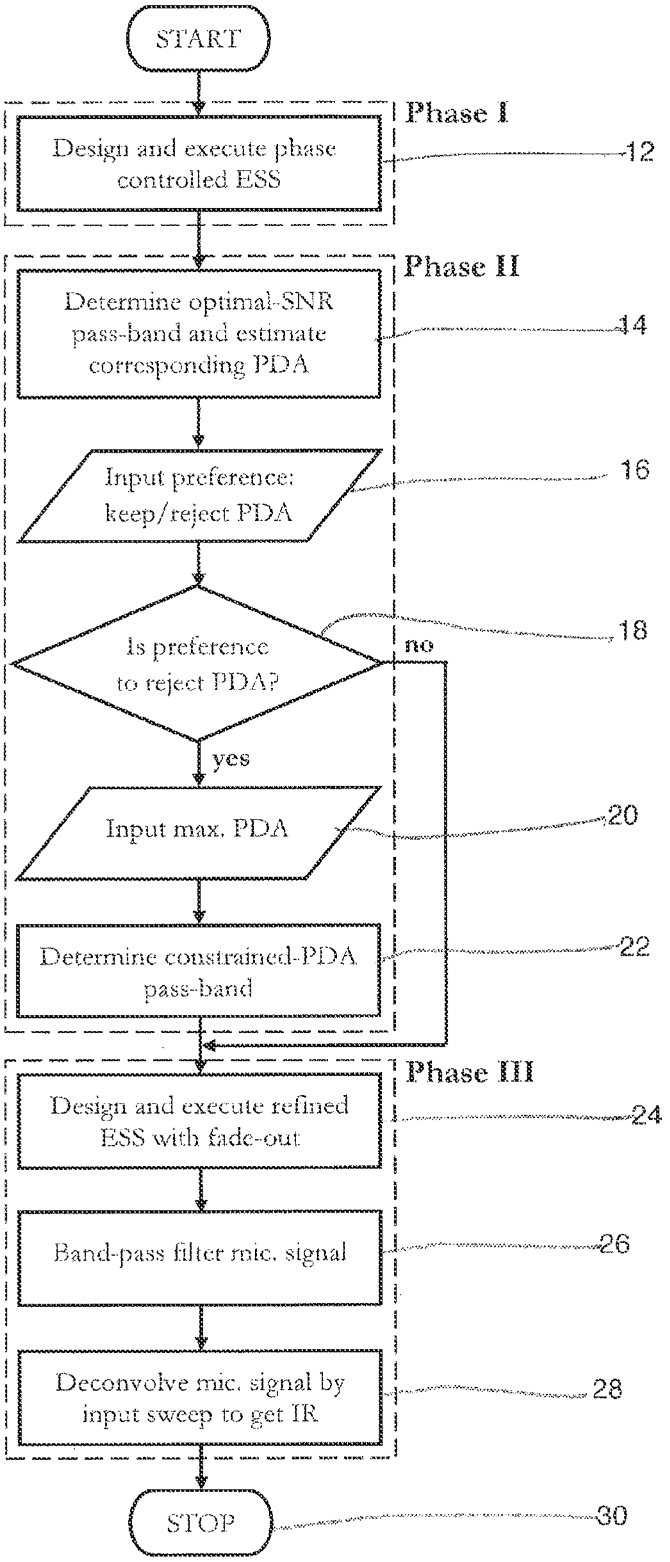
FIG. 1 is a flowchart of the steps of the method for measuring low-noise acoustical impulse responses of the present invention.
Figure 3:
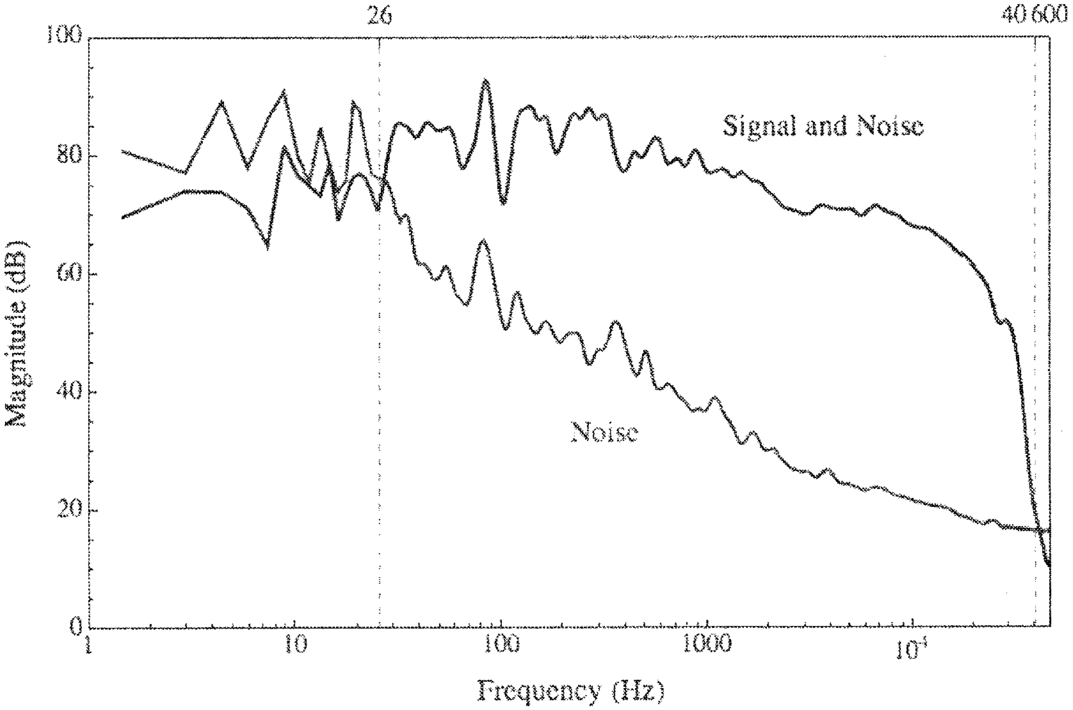
FIG. 3 is a plot of the sampled noise floor, the initial measurement's frequency spectrum, and the optimal-SNR (signal-to-noise ratio) pass-band.

Referring to FIGS. 1 and 3, the method for measuring low-noise acoustical impulse responses of the present invention begins by designing and executing a short (approximately 1 second long) phase-controlled ESS in step 12. For this sweep, the final frequency is set equal to the Nyquist frequency (one half of the sampling rate) and the initial frequency is nominally set to 20 Hz. The phase-controlled nature of this sweep requires that the initial frequency be adjusted to an integer number of octaves (powers of 2) below the final frequency. The details of the phase-controlled sweep design are described by Katja Vetter and Serafino di Rosario in the article "ExpoChirpToolbox: a Pure Data implementation of ESS impulse response measurement," presented at the 4$^{th}$ Pure Data Convention, 2011.

Following the first sweep, in step 14, an "optimal-SNR" pass-band is determined by finding the widest possible frequency range over which the signal-to-noise ratio (SNR)

is positive. For this pass-band, a measure of the effects of filtering the system response with a corresponding band-pass filter is estimated. The measure of interest is called the peak deviation amplitude (PDA), which quantifies the largest possible pre-response amplitude that will result from band-pass filtering over the previously found pass-band. The PDA is estimated based on the measured frequency response magnitude at the pass-band edge frequencies using models derived by Joseph G. Tylka et al. in the article "A New Approach to Impulse Response Measurements at High Sampling Rates," presented at the AES 137$^{th}$ Convention, October 2014.

In step 16, the user specifies as to whether the estimated PDA value is acceptable. For example, the user (which can be a user of the method or any system that relies on the method) may decide that the PDA must be less than or equal to 1% of the impulse response's peak amplitude. If this upper-limit is not exceeded, then the user selects to accept the predicted PDA value. Alternatively, in an automatic version of the method, the minimum acceptable PDA is specified a priori. In step 18, the user decides to accept or not accept the predicted PDA depending on the requirements of the particular application the method is used for. If the user elects to accept the predicted PDA value, then, in step 24, a refined, band-limited ESS that sweeps through the optimal-SNR pass-band alone is designed and executed, including a fade-out to prevent an end-of-sweep "pop". Ideally, this second sweep is as long as possible considering the environment in order to increase the signal-to-noise ratio. In one preferred embodiment, the second sweep is in the range of 5-10 seconds. The microphone signal is then band-pass filtered in step 26 and deconvolved by the input sweep in step 28 to get the final impulse response. At that point the process is concluded in step 30.

If the estimated PDA value is determined to be not acceptable in step 18, then the user is asked to specify a maximum tolerable PDA value in step 20. A new "constrained-PDA" pass band is now found in step 22 to satisfy the specified maximum. Using the same PDA models as in step 14, the lowest low-edge frequency that results in one half of the maximum PDA value is found. Similarly, the highest high-edge frequency that results in one half of the maximum PDA value is found. Therefore, the net effect of applying the corresponding "constrained-PDA" band-pass filter will not result in a PDA value that exceeds the maximum set by the user. In step 24, a refined, band-limited ESS that sweeps through the constrained-PDA pass-band alone is designed and executed, including a fade-out to prevent an end-of-sweep "pop". The second sweep here is preferably as long as possible considering the environment in order to increase the signal-to-noise ratio. The microphone signal is then band-pass filtered in step 26 and deconvolved by the input sweep in step 28 to get the final impulse response. At that point the process is concluded in step 30.

Figure 2:
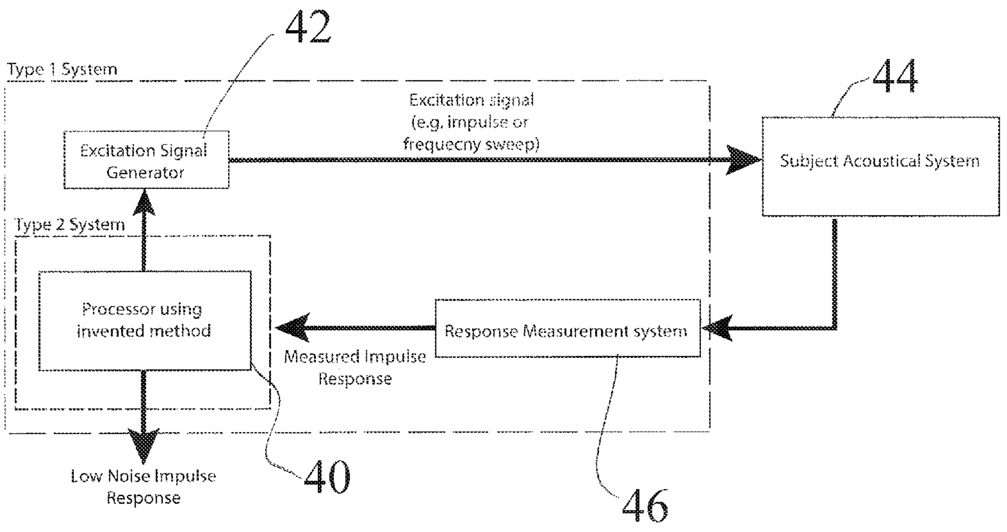
FIG. 2 is a black diagram of the system for measuring low noise acoustical impulse responses of the present invention.

Referring to FIG. 2, in one embodiment, the system of the present invention includes a processor 40 and an excitation signal generator 42 that provides an excitation signal to a subject acoustical system 44. An impulse response is provided by the subject acoustical system to a response measurement system 46 which provides a measured impulse response to processor 40 which in turn generates the low noise impulse response. In another embodiment the processor 40 processes the signals and applies the method of the present invention after the signal excitation and measurements are done by external systems/hardware.

FIG. 3 shows an example of the optimal-SNR pass-band found in step 14 of FIG. 1. The frequency spectrum of the microphone signal 50 is compared to that of the ambient noise 52 and the intersections of these two spectra define the pass-band edge frequencies.

FIG. 4 shows an example of experimental data from employing the system and method for producing low-noise acoustical impulse responses at high sampling rates of the present invention. From the initial measurement, the optimal-SNR pass-band is found to be 26 Hz to 40.6 kHz, as illustrated in FIG. 4. For a maximum tolerable PDA value equal to 2% of the impulse response's peak amplitude, the constrained-PDA pass-band is found to be 81 Hz to 36.9 kHz. As the constrained-PDA pass-band is defined based on estimated PDA values, the measured PDA value will tend to be less than the maximum. Compared to the initial sweep, the optimal-SNR sweep and band-pass filter achieve an improvement of 16 dB in SNR, with a measured PDA value of less than 0.2% of the impulse response's peak amplitude. Compared to the initial sweep, the constrained-PDA sweep and band-pass filter achieve an improvement of 3 dB, with a measured PDA value of less than 0.4% of the impulse response's peak amplitude.

The method and system of the present invention described above can be used in many applications that require high-fidelity impulse response measurements at high sampling rates. Such applications include high-resolution 3D headphones processors, high-resolution audio components that rely on calibration though impulse response measurements, and instruments for characterizing acoustical systems at high resolution such as transducers, acoustical spaces and for measuring head-related impulse responses (HRIR). The method and system of the present invention could also be used in other commercial and industrial products that rely on, or require, low-noise high sample rate measurements such as virtual reality audio systems and other non-audio applications where low-noise, high sample rate impulse measurements are needed or required.

The method and system of the present invention also allow low-noise measurements, free of non-causal pre-response contamination, of acoustical impulse responses at high sampling rates. As mentioned above, an important application of this method and system is its use in 3D headphones processors where interpolation between two or more impulse responses is required to apply the appropriate digital filter as a function of the tracked head rotation coordinate (yaw angle) in order to fix the perceived audio image in 3D space so that that the image does not move with the listener's head as such motion severely degrades the ability of a listener to head externalize the sound.

By using high sampling rates of 96 kHz or more, the method of the present invention reduces the effects of time smearing, which may otherwise prevent the capture of the minimum perceptible inter-aural time difference, a vital spatialization cue for accurate binaural audio.

The only relative disadvantage the new method has over the prior art methods is the requirement of two sweeps. This disadvantage is a minor issue as the sweeps can be easily automated in a processor using pre-defined user preferences, and the benefits justify the additional sweep.

While the foregoing invention has been described with reference to its preferred embodiments, various alterations and modifications will occur to those skilled in the art. All such variations and modifications are intended to fall within the scope of the appended claims.

What is claimed is:

1. A method for producing low-noise acoustical impulse responses at high sampling rates comprising the steps of:
- running a first exponential sine sweep through a subject acoustical system up to the Nyquist frequency to provide an estimate of said acoustical system's response;
- sampling ambient noise entering said acoustical system;
- determining, from said acoustical system's response and said ambient noise, pass-band of said acoustical system;
- running a second exponential sine sweep through said acoustical system over said pass-band alone to produce an output signal, said second exponential sine sweep being slower than said first exponential sine sweep; and
- applying a band-pass filter to said output signal to suppress noise and produce a low-noise measured impulse response, said band-pass filter having the same pass-band as said determined pass band.

2. The method for producing low-noise acoustical impulse responses at high sampling rates of claim 1 wherein said step of running a first exponential sine sweep comprises running a phase controlled exponential sine sweep in which a final frequency is set to the Nyquist frequency and an initial frequency is set below the Nyquist frequency and is adjusted to an integer number of octaves below said final frequency.

3. The method for producing low-noise acoustical impulse responses at high sampling rates of claim 1 wherein said step of determining a pass-band comprises finding a widest possible frequency range over which a signal-to-noise ratio (expressed in decibels) is positive.

4. The method for producing low-noise acoustical impulse responses at high sampling rates of claim 3 wherein said step of determining a peak deviation amplitude further comprises utilizing a constrained peak deviation amplitude if said determined peak deviation amplitude is not acceptable.

5. The method for producing low-noise acoustical impulse responses at high sampling rates of claim 1 wherein said step of determining a pass-band comprises the steps of:
- finding a widest possible frequency range over which a signal-to-noise ratio (expressed in decibels) is positive;
- determining a peak deviation amplitude corresponding to said frequency range; and
- adjusting said frequency range to produce a constrained peak deviation amplitude if said determined peak deviation amplitude is not acceptable.

6. A system for producing low-noise acoustical impulse responses at high sampling rates comprising:
- an excitation signal generator for producing exponential sine sweep signals that are sent through an acoustical system;
- a response measurement system for determining a measured impulse response of said acoustical system;
- a processor that controls said excitation signal generator and uses said measured impulse response to produce a low-noise measured impulse response by:
  - running a first exponential sine sweep through said acoustical system up to the Nyquist frequency to provide an estimate of said acoustical system's response,
  - sampling ambient noise entering said acoustical system determining, from said acoustical system's response and said ambient noise, a pass-band of said acoustical system;
  - running a second exponential sine sweep through said acoustical system over said pass-band alone to produce an output signal, said second exponential sine sweep being slower than said first exponential sine sweep; and
  - applying a band-pass filter to said output signal to suppress noise and produce a low-noise measured impulse response, said band pass filter having the same pass-band as said determined pass-band.

* * * * *